United States Patent [19]

Arnold et al.

[11] 4,308,310

[45] Dec. 29, 1981

[54] DRY TRANSFER DECAL

[75] Inventors: Kevin R. Arnold, Unionville; Raymond M. Arnold, West Chester, both of Pa.

[73] Assignee: Advanced Graphic Technology, Edgemont, Pa.

[21] Appl. No.: 71,887

[22] Filed: Sep. 4, 1979

[51] Int. Cl.$^3$ .......................... B32B 3/18; B41M 3/12

[52] U.S. Cl. .................................... 428/195; 156/240; 156/249; 156/277; 427/265; 428/352; 428/353; 428/354; 428/914

[58] Field of Search ............... 156/234, 239, 240, 249, 156/277; 427/146–149, 265; 428/195, 202, 204, 207, 343, 353, 354, 355, 913, 914, 352

[56] References Cited

U.S. PATENT DOCUMENTS

| | | | |
|---|---|---|---|
| 2,733,997 | 2/1956 | Asnes | 428/320 |
| 3,013,917 | 12/1961 | Karlan et al. | 156/240 X |
| 3,131,106 | 4/1964 | Mackenzie | 428/77 X |
| 3,298,850 | 1/1967 | Reed et al. | 428/914 X |
| 3,423,376 | 3/1969 | Reed et al. | 156/234 |
| 3,741,787 | 6/1973 | Tordjman | 156/234 X |
| 3,987,225 | 10/1976 | Reed et al. | 428/914 X |
| 4,112,178 | 9/1978 | Brown | 428/914 X |
| 4,171,398 | 10/1979 | Hunt | 156/234 X |

*Primary Examiner*—Bruce H. Hess

*Attorney, Agent, or Firm*—Allegretti, Newitt, Witcoff & McAndrews

[57] ABSTRACT

A dry transfer decal includes a flexible carrier layer as a substrate with a high adhesion characteristic urethane layer on the substrate. Ink layers are printed on the urethane layer and a high tack adhesive is screened over the printed ink layers. The decal may be transferred from the substrate to a surface by applying a local pressure through the substrate on the decal thereby impinging the decal onto the surface. Specific formulations for the urethane layer and the various ink layers are disclosed.

6 Claims, 3 Drawing Figures

DRY TRANSFER DECAL

BACKGROUND OF THE INVENTION

This invention relates to an improved dry transfer decal.

Dry transfer decals have been known for some time. Their development was as a replacement for the prior art water slide decals and constituted an effort to provide a more convenient system for applying decals. Typical of dry transfer decals are those described in MacKenzie, U.S. Pat. No. 3,131,106, Karlan U.S. Pat. No. 3,013,917 and Tordjman U.S. Pat. No. 3,741,787.

The dry transfer decals described in the above references utilize a low tack adhesive that is basically dry to the touch. These adhesives are generally weak and consist of soft wax-like materials that will bond by the application of pressure to paper or similar materials. Once applied to a surface, such decals are easily damages by abrasion though they do adequately satisfy the artistic or design purpose for which they are fashioned.

There remains, therefore, many instances when a more rugged abrasion resistant dry transfer decal is required. For example, industrial labels, sign labels and hobby model labels generally require more abrasion resistance than that available from products disclosed in the above identified references.

Water slide labels have also been commonly used to decorate plastic models made by hobby makers. Such decals are quite fragile and do not adhere well. If the decal is soaked in water for too long a period of time, the gum adhesive is washed from the decal and it will not adhere to a surface. Placement of such a decal is also a problem since such decals must slide about until the correct position is achieved. This spreads the adhesive into areas of a surface where the adhesive is not desired.

To overcome such described difficulties, ordinary high tack pressure sensitive dry decals have been suggested, and in an industrial environment such decals are described in Asnes U.S. Pat. No. 2,733,997. However, the decal disclosed in the Asnes patent is quite difficult to position accurately due to the fact that it is printed on opaque substrates such as wax or polypropylene coated kraft paper. Also due to the high tack nature of the adhesive, once the decal touches the surface it tends to bond tightly, precluding further movement. Consequently it is almost impossible to utilize such a decal for a plastic model hobby kit, for example. To overcome such problems, the present invention was devised.

SUMMARY OF THE INVENTION

In a principal aspect, the present invention comprises a dry transfer decal which includes a flexible carrier layer as a substrate. A high adhesive characteristic lacquer, generally a urethane resin, is defined as a first layer on the substrate or carrier layer. Subsequent layers of printed ink material are then defined on the first layer. Finally, a high tack adhesive layer is screened or printed on the printed ink layers. The decal may be removed and positioned from the carrier layer or substrate by means of a stylus or other instrument which is designed to provide localized release pressure through the substrate onto the decal. The high adhesion characteristic lacquer layer, which defines the first layer, is preferably a urethane resin as defined more particularly in the following specification. This first layer in cooperation with the other layers of the decal has a unique synergistic effect that permits use of a very high tack adhesive layer for attachment of the decal to a surface and provides for release of the decal from the substrate in a controlled manner.

Thus it is an object of the present invention to provide an improved dry transfer decal.

It is a further object of the present invention to provide an improved dry transfer decal which utilizes a high tack adhesive layer.

Still another object of the present invention is to provide a dry transfer decal which provides for use of a transparent carrier layer or substrate for the decal and for a high tack adhesive layer for attachment of the decal to a surface.

Another object of the present invention is to provide an improved dry transfer decal which may be fabricated by conventional printing and screening methods in an inexpensive and efficient manner.

Still another object of the present invention is to provide a dry transfer decal which is easily and inexpensively manufactured, which is easy to apply to a surface and which has a high abrasion resistance upon application to a surface.

These and other objects, advantages and features of the invention will be set forth in the detailed description which follows.

BRIEF DESCRIPTION OF THE DRAWING

In the detailed description which follows, reference will be made to the drawing comprised of the following figures.

DESCRIPTION OF THE PREFERRED EMBODIMENT

Figure 1:
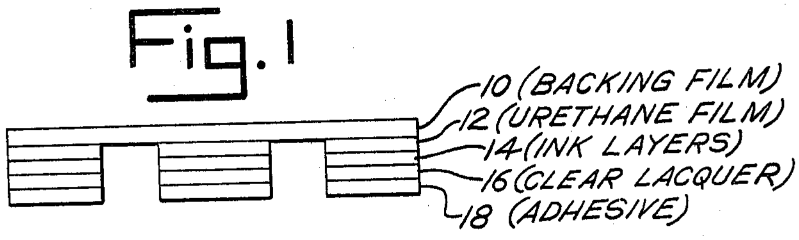
FIG. 1 is an enlarged side sectional view of the improved dry decal illustrating the sequence of layers used to form the decal.
Figure 2:
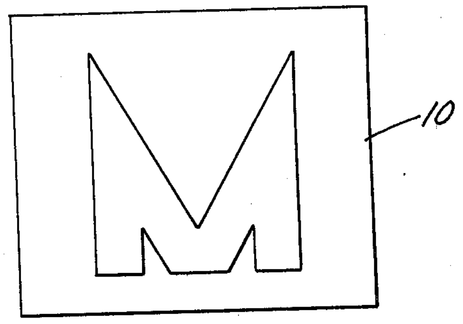
FIG. 2 is a top plan view of a typical decal incorporated in the present invention.

Referring to the figures, the decal of the present invention is mounted on a semirigid or flexible substrate, or backing film 10 which defines a flexible carrier. The substrate 10 is preferably made from a high impact styrene modified with rubber or a butadiene compound. Preferably the substrate 10 is transparent or translucent so that a decal can be clearly seen through the substrate and the model or surface onto which the decal is to be placed can also be clearly seen in detail, particularly once the decal is within ½" to 1" from the surface. This enables accurate placement of the decal on the surface. The substrate 10 is semirigid so that a sheet of printed decals may be easily handled if necessary by holding the sheet at one corner, for example. A suitable substrate 10 will have a thickness of between 0.004" and 0.007". Various other materials may be used for the substrate 10 such as polyester, vinyl or cellulose acetate, or transparent pure styrene. The preferred substrate 10, however, is the high impact polystyrene referenced above.

The decal construction has, as its next or unique synergistic layer, a high adhesive characteristic lacquer defining a first layer 12 on the flexible carrier or substrate 10. The first layer 12 is chosen so that it sufficiently resists the pull of a high tack adhesive in case of accidental contact of the decal onto a surface which might cause transfer to an inappropriate place. The first layer thus is a specific material which bonds strongly to the substrate 10 and can be peeled from that substrate 10 only upon sufficient adhesion of the remainder of the decal to a surface. As a requirement for the first layer, it should be tough and flexible in order to give a required abrasion resistance and conformability to the surface on which it is ultimately placed.

It has been discovered that certain urethane resins in combination with the substrate 10 provide the desired properties of extreme flexibility, elongation, high intrinsic adhesion to a substrate and removability when a peeling action is applied. The urethane resins chosen also include preferably the addition of nitrocellulose to improve printing properties during the formation of the decal product. The formulated resin having the required characteristics is generally applied by a screening process onto the substrate 10 such that the resin material 12 covers all of the graphics associated with a design of the final decal.

Once the urethane resin material 12 is screened on the substrate 10, various layers 14 of printed ink which will define the graphics of the decal may be applied as additional sequential layers 14. The application of the additional layers 14 is typically by a printing process such as letter press, lithography, flexography or a screening process.

Once the graphics have been applied by means of the layers 14, an additional layer 16 of clear lacquer may be applied to provide additional integrity to the decal. The clear lacquer layer 16 adds intrinsic strength to the decal especially when the printing of the graphics has been by a lithographic process and the ink layers are very thin. This additional layer 16 may be pigmented if necessary in order to blend into a colored surface or background. The layer 16 is in close register with the urethane or first layer 12 in order to give appropriate total coverage of the graphic layers 14.

Once the label as described has been printed, adhesive 18 is then applied to the decal. Adhesive 18 is applied by a screening process. Preferably the adhesive is a blend of polyvinyl ethers in an inert solvent compounded with an amorphous filler such as finely divided silica known as aerosil. The addition of the aerosil material to what is a basically high tack adhesive tends to slightly mask the surface tack. This results since the aerosil floats up toward the surface of the adhesive 18 as it dries. Then on application of pressure, the tacky components of the adhesive 18 will exude about the surface silica particles and a high tack adhesive is thereby applied directly on a surface. The silica thus reduces the tack of the adhesive 18 sufficiently to enable normal handling to take place without having the decals adhere to a finger.

Figure 3:
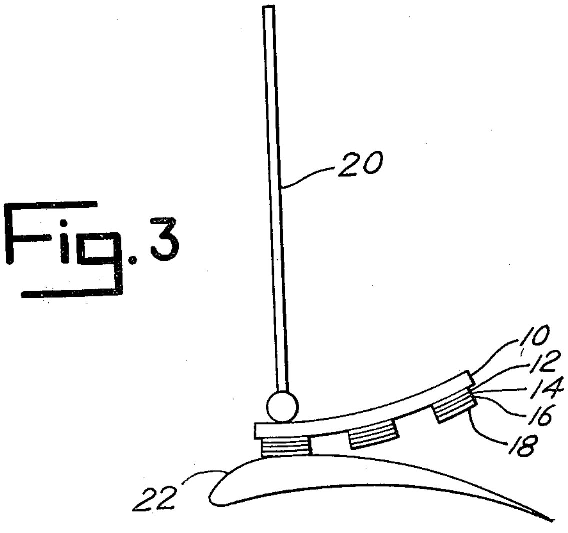
FIG. 3 is a side schematic view showing the manner in which the decal of the present invention is applied to a surface.

In practice, a stylus or other sharp instrument 20 is used to impinge against the backing film or substrate 10 and thereby drive the decal onto a surface 22 as shown in FIG. 3. Once this decal application is initiated as described, it is possible to peel the substrate 10 from the remainder of the decal and also utilize the stylus 20 or similar instrument to impinge or adhere the decal tightly onto the surface 22.

Generally the first layer 12 has a formulation in the following range:

(a) 10–25% by weight of a solvent soluble flexible urethane resin;
(b) 0–2% by weight nitrocellulose;
(c) 0–5% by weight of a plasticizer;
(d) 30–60% by weight of a solvent.

This mixture will characteristically be compounded to have film extensibility of between 50 and 500%.

A general formulation for the adhesive 18 is as follows:

(a) 10–30% by weight high molecular weight polyvinyl ether;
(b) 5–20% by weight tackifying resins;
(c) 5–20% by weight plasticizing resin;
(d) 20–30% by weight solvent;
(e) up to 8% by weight highly dispersed silica.

Following are specific examples of the application and manufacture of the improved dry transfer decal of the present invention:

EXAMPLE 1

A sheet 10 of extruded polystyrene modified with 5–10% Butadiene resin, thickness, 0.005" was printed with the following high adhesion property lacquer or first layer 12:

| | Supplier | Percentage by weight |
|---|---|---|
| Estane 5715 - urethane resin | Goodrich | 21.60 |
| Nitrocellulose ¼ sec. | Hercules | .27 |
| Paraplex RGA-2 (polyester resin) | Rohm and Haas | .16 |
| Di-octyl phthalate | Eastman Kodak | .01 |
| Cellosolve acetate | | 44.56 |
| Butyl cellosolve | | 33.40 |
| | | 100.00% |

The lacquer was printed in discrete areas using conventional screen process to give a dry layer of approximately 0.001" in thickness. As an indication of the properties of the layer 12, after drying this lacquer layer 12, it could be peeled away from the substrate 10 by applying Scotch tape to the edge of one end of one of the discrete printed areas and applying a constant load. A pull of approximately 50 grams/inch width was necessary to achieve this separation. After removing the layer of lacquer from the film it could be shown to have an extensibility of approximately 200%.

Subsequently, screen inks 14 with the following compositions A, B, C and D were printed in sequence to give the required graphics:

| | A | B | C | D | E |
|---|---|---|---|---|---|
| Chinaclay | 10.0 | 10.0 | 10.0 | 10.0 | 3.0 |
| Titanium dioxide | 20.0 | — | — | — | — |
| Carbon black | — | 10.0 | — | — | — |
| Ultramarine Blue | — | — | 20.0 | — | — |
| Naphthanil Red | — | — | — | 10.0 | — |
| Nitro cellulose | 18.8 | 21.6 | 18.8 | 21.6 | 24.1 |
| *Paraplex RGA-2 | 11.2 | 13.3 | 11.2 | 13.3 | 16.6 |
| Cellosolve acetate | 29.3 | 33.8 | 29.3 | 33.8 | 53.7 |
| Di-octyl phthalate | 10.7 | 11.3 | 10.7 | 11.3 | 2.6 |
| | 100.0% | 100.0% | 100.0% | 100.0% | 100.0% |

*A polymeric plasticizer (polyester resin) supplied by Rohm & Haas.

A clear layer 16 of formulation (E) was printed over the colored graphics to give added toughness to the decal. The clear formulation was printed in close register with the first high release lacquer layer 12.

As a last process, a high tack adhesive 18 was applied by a screen process. Adhesive 18 had the following composition:

| | Supplier | Percentage |
|---|---|---|
| 1. Lutonal A.50 (High molecular weight polyvinyl ether) | B.A.S.F | 23.00 |
| 2. Cellolyn 21 (A phthalate ester of hydroabietyl alcohol) | Hercules | 15.75 |
| 3. Stabelite ester 10 (An ester of hydrogenated rosin) | Hercules | 12.50 |
| V. M. & P. Naphtha | | 17.00 |
| Solvesso 150 | | 24.75 |
| 4. Aerosil 300 | Degussa | 7.00 |
| (Finely dispersed silica) | | 100.00% |

Prior to the addition of the Aerosil, the adhesive has a peel strength in excess of 200 grams per inch width. When the aerosil is added the low pressure (less than 20 $gm/cm^2$) tack of the adhesive is approximately 25 grams/inch. The full tack is not generated until a pressure of 2500 $gms/cm^2$ is applied, such as might result from pressing on the edge of the decal with a thumbnail or a rounded plastic stylus. No distortion of the sheet 10 is necessary to effect bonding to the article being decorated. Once one edge of the decal has been attached to the article, the complete decal may be peeled from the sheet and fixed in its final position by rubbing with a finger tip or plastic stylus.

The decal shows very good adhesion to plastic models made from polystyrene or polypropylene and can also be applied to wood, paper or metal or painted metal surfaces.

EXAMPLE 2

The high adhesion lacquer as in Example 1 was screen printed onto 0.003" matt Melinex (polyester film from I.C.I.). After drying it was subsequently over printed with commercially available lithographic inks made by Sinclair and Valentine. The advantage of the controlled release lacquer was that the sheets could be passed through a single color lithographic press several times without picking off the screen printed lacquer coat 12.

Subsequent to the lithographic printing a white flexible ink was screen printed to give the decal opacity (as formula A in Example 1) and strength. The final operation was to apply the adhesive 18 as in Example 1 to complete the decal.

The decals could be applied and used in exactly the same way as the wholely screen printed version of Example 1 and have the advantage that full color process work could be used to print the graphic.

Preferred embodiments have been disclosed. However, the invention is to be limited only by the following claims and their equivalents.

What is claimed is:

1. A dry transfer decal comprising, in combination:

a flexible carrier layer as a substrate;

a high adhesion characteristic lacquer printed in a desired pattern as a first layer on the carrier layer, the high adhesion characteristic lacquer comprising the following mixture:

(a) 10–25% by weight of a solvent soluble flexible urethane resin;

(b) 0–2% by weight nitrocellulose;

(c) 0–5% by weight of a plasticiser;

(d) 30–60% by weight of a solvent, said mixture having extensibility as a dry film of between 50 and 500%;

at least one subsequent printed pattern layer on the first layer; and a high tack adhesive layer on said printed pattern layer, said high tack adhesive comprising the following mixture:

(a) 10–30% by weight high molecular weight polyvinyl ether;

(b) 5–20% by weight tackifying resins;

(c) 5–20% by weight plasticising resin;

(d) 20–30% by weight solvent; and (e) 2–8% by weight highly dispersed silica, said high adhesion characteristic lacquer defining means to retain the printed layer and the high tack adhesive layer on the substrate until the high tack adhesive layer is subjected to localize release pressure, said high adhesion characteristic lacquer having flexibility greater than that of the flexible carrier substrate.

2. The decal of claim 1 wherein said carrier layer is from the group consisting of polystyrene, modified polystyrene, polyester, rigid vinyl and cellulose acetate film.

3. The decal of claim 1 including a sequence of printed ink layers on the first layer to provide a multicolored decal.

4. The decal of claim 1 including an additional clear film over the printed layers.

5. The decal of claim 1 wherein the printed layers comprise one or more of the following formulations (A–E) printed sequentially on the first layer:

| | A | B | C | D | E |
|---|---|---|---|---|---|
| Chinaclay | 10.0 | 10.0 | 10.0 | 10.0 | 3.0 |
| Titanium dioxide | 20.0 | — | — | — | — |
| Carbon black | — | 10.0 | — | — | — |
| Ultramarine Blue | — | — | 20.0 | — | — |
| Naphthanil Red | — | — | — | 10.0 | — |
| Nitro cellulose | 18.8 | 21.6 | 18.8 | 21.6 | 24.1 |
| Polymeric Plasticizer | 11.2 | 13.3 | 11.2 | 13.3 | 16.6 |
| Cellosolve acetate | 29.3 | 33.8 | 29.3 | 33.8 | 53.7 |
| Di-octyl phthalate | 10.7 | 11.3 | 10.7 | 11.3 | 2.6 |
| | 100.0% | 100.0% | 100.0% | 100.0% | 100.0% |

6. A dry transfer decal comprising in combination:

a flexible carrier layer as a substrate;

a high adhesion characteristic lacquer printed in a desired pattern as a first layer on the carrier layer, the high adhesion characteristic lacquer consisting essentially of (a) 21.60% urethane resin;

(b) 0.27% nitrocellulose;

(c) 0.16% polyester resin plasticizer;

(d) 0.01% dioctyl phthalate;

(e) 44.56% cellose acetate; and (f) 33.40% butyl cellosolve said mixture having extensibility as a dry film of between 50 and 500%;

at least one subsequent printed pattern layer on the first layer; and a high tack adhesive layer on the printed layer, said high tack adhesive layer comprising the following mixture:

(a) 10–30% by weight, high molecular weight polyvinyl ether;

(b) 5–20% by weight tactifying resins;

(c) 5–20% by weight plasticizing resin;

(d) 23% by weight solvent; and (e) 2–8% by weight high dispersed silica, said high adhesion characteristic lacquer defining means to retain the printed layer and the high tack adhesive layer on the substrate until the high tack adhesive layer is subjected to localized release pressure.

* * * * *